United States Patent [19]
Ohtsuka

[11] Patent Number: 5,053,863
[45] Date of Patent: Oct. 1, 1991

[54] CIRCUIT FOR PROCESSING DIGITAL VIDEO SIGNALS

[75] Inventor: Isao Ohtsuka, Tokyo, Japan

[73] Assignee: NEC Corporation, Tokyo, Japan

[21] Appl. No.: 391,882

[22] Filed: Aug. 9, 1989

[30] Foreign Application Priority Data

Aug. 10, 1988 [JP] Japan ............................ 63-200507

[51] Int. Cl.$^5$ .................... H04N 9/64; H04N 9/89
[52] U.S. Cl. ............................ 358/21 R; 358/17; 358/22
[58] Field of Search .............. 358/17, 21 R, 35, 148, 358/160, 320, 324, 337, 339, 22; 360/36.1, 36.2

[56] References Cited

U.S. PATENT DOCUMENTS

| | | | |
|---|---|---|---|
| 4,138,694 | 2/1979 | Doi et al. | 358/339 |
| 4,163,249 | 7/1979 | Michael et al. | 358/21 R |
| 4,335,395 | 6/1982 | Clarke | 358/11 |
| 4,346,401 | 8/1982 | Ohara | 358/75 |
| 4,376,948 | 3/1983 | Dischert et al. | 358/13 |
| 4,625,234 | 11/1986 | Yamada | 358/75 |
| 4,851,909 | 7/1989 | Noske et al. | 358/339 |

FOREIGN PATENT DOCUMENTS

| | | | |
|---|---|---|---|
| 0024286 | 2/1983 | Japan | 358/13 |
| 0032278 | 2/1984 | Japan | 358/13 |
| 0230794 | 11/1985 | Japan | 358/13 |
| 2051517 | 1/1981 | United Kingdom | 358/13 |

Primary Examiner—John W. Shepperd
Assistant Examiner—Michael D. Parker
Attorney, Agent, or Firm—Helfgott & Karas

[57] ABSTRACT

A P/S converter converts parallel digital video signals such as a luminance signal Y and color difference signals R-Y and B-Y to serial digital video signals which are written into a semiconductor memory. The serial digital video signals read from the semiconductor memory are converted in a S/P converter to parallel digital video signals. A clock generator supplies clock signals to the P/S and S/P converters, such that a phase of the clock signals for the S/P converter has a predetermined relation to a phase of the clock signals for the P/S converter. As a result, the number of input and output pins is decreased in the semiconductor memory to result in the decreased of the fabricating cost thereof.

6 Claims, 11 Drawing Sheets

CIRCUIT FOR PROCESSING DIGITAL VIDEO SIGNALS

FIELD OF THE INVENTIONS

The invention relates to a circuit for processing digital video signals, and more particularly to a circuit for processing digital video signals in which the delay of video signals and the correction of time base are carried out.

BACKGROUND OF THE INVENTION

A conventional circuit for processing digital video signals has been described on pages 48, 50 and 51 of "The Television Technology, February of 1987." The conventional circuit for processing digital video signals comprises a random access memory (RAM) into which luminance signals Y, color difference signals R−Y and B−Y are written and from which these signals are read, and serial to parallel (S/P) converters or demultiplexers and parallel to serial (P/S) converters or multiplexers for making a sampling frequency of the luminance signal Y in alignment with those of the color difference signals R−Y and B−Y.

In operation, a luminance signal Y of 8 bits is supplied from an NTSC decoder to the S/P converter in which the luminance signal is converted to be of 32 bits, and the luminance signal is written into the RAM by data of each four clocks simultaneously with color difference signals R−Y and B−Y of 8 bits supplied from the NTSC decoder. These signals written into the RAM are read therefrom to provide a luminance signal of 32 bits and color difference signals R−Y and B−Y of 8 bits. The luminance signal of 32 bits is converted in the P/S converter to a signal of 8 bits which is supplied to an NTSC together with the color difference signals R−Y and B−Y. Thus, the delay of video signals and the correction of time base can be carried out by using a memory.

However, the conventional circuit for processing digital video signals has a disadvantage in that the RAM must be provided with input and output pins as many as 48 input pins and 48 output pins to process the signals of the aforementioned bit number, where a semiconductor memory is used for the RAM. Therefore, the fabricating cost for the semiconductor memory is high.

SUMMARY OF THE INVENTION

Accordingly, it is an object of the invention to provide a circuit for processing digital video signals in which the number of input and output pins is decreased.

It is another object of the invention to provide a circuit for processing digital video signals, the fabricating cost of which is decreased.

According to invention, a circuit for processing digital video signals, comprises:
- first means for converting parallel digital video signals to serial digital video signals;
- a semiconductor memory in which said serial digital video signals are stored;
- a second means for converting serial digital video signals read from said semiconductor memory to parallel digital video signals; and
- at least one clock generator for generating clock signals by which said first and second means are controlled to carry out the conversions of said digital video signals, said clock signals for said second means having a predetermined phase relation to said clock signals for said first means.

BRIEF DESCRIPTION OF THE DRAWINGS

The invention will be explained in more detail in conjunction with appended drawings, wherein.

DESCRIPTION OF THE PREFERRED EMBODIMENTS

Before explaining a circuit for processing digital video signals in the embodiment according to the invention, the aforementioned conventional circuit for processing digital video signals will be explained in FIGS. 1 to 4.

Figure 1:
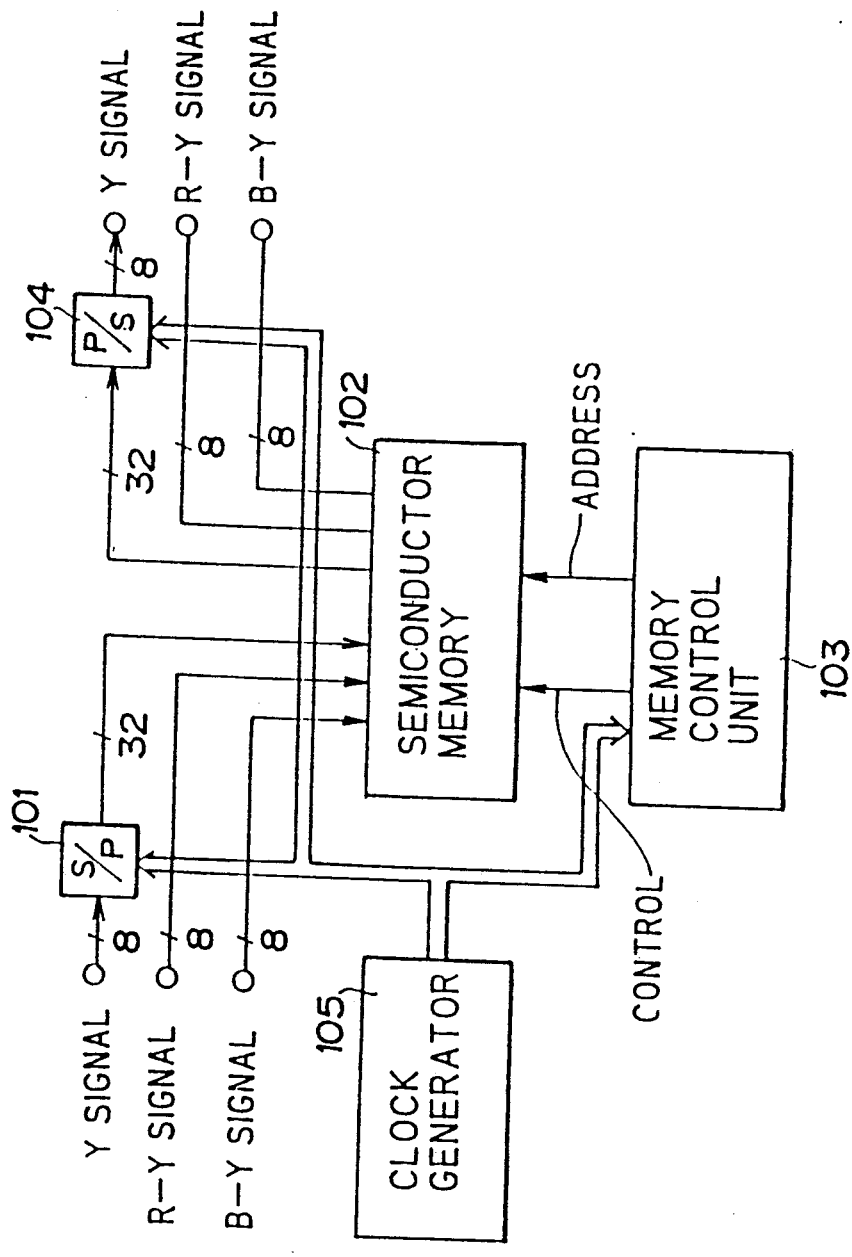
FIG. 1 is a block diagram showing a conventional circuit for processing digital video signals.

In FIG. 1, an 8 bit luminance signal Y of a sampling signal 2 fsc is supplied to a S/P converter (demultiplexer) 101, in which a 32 bit luminance signal of a sampling signal ½ fsc is converted in accordance with clock signals generated in a clock generator 105, and supplied therefrom to a semiconductor memory 102, where fsc is a color sub-carrier frequency. The semiconductor memory 102 is simultaneously supplied with 8-bit color difference signals R−Y and B−Y of the sampling signal ½ fsc. These signals are written into the semiconductor memory 102, wherein addresses are designated by address signals supplied from a memory control unit 103 and timings are controlled by write-control signals supplied from the memory control unit 103. Then, these signals thus written into the semiconductor memory 102 are read out therefrom by the control of the memory control unit 103, and the 32 bit luminance signal Y of the sampling signal ½ fsc is converted (multiplexer) in a P/S converter 104 to an 8 bit luminance signal Y of the sampling signal 2 fsc.

Figure 2:
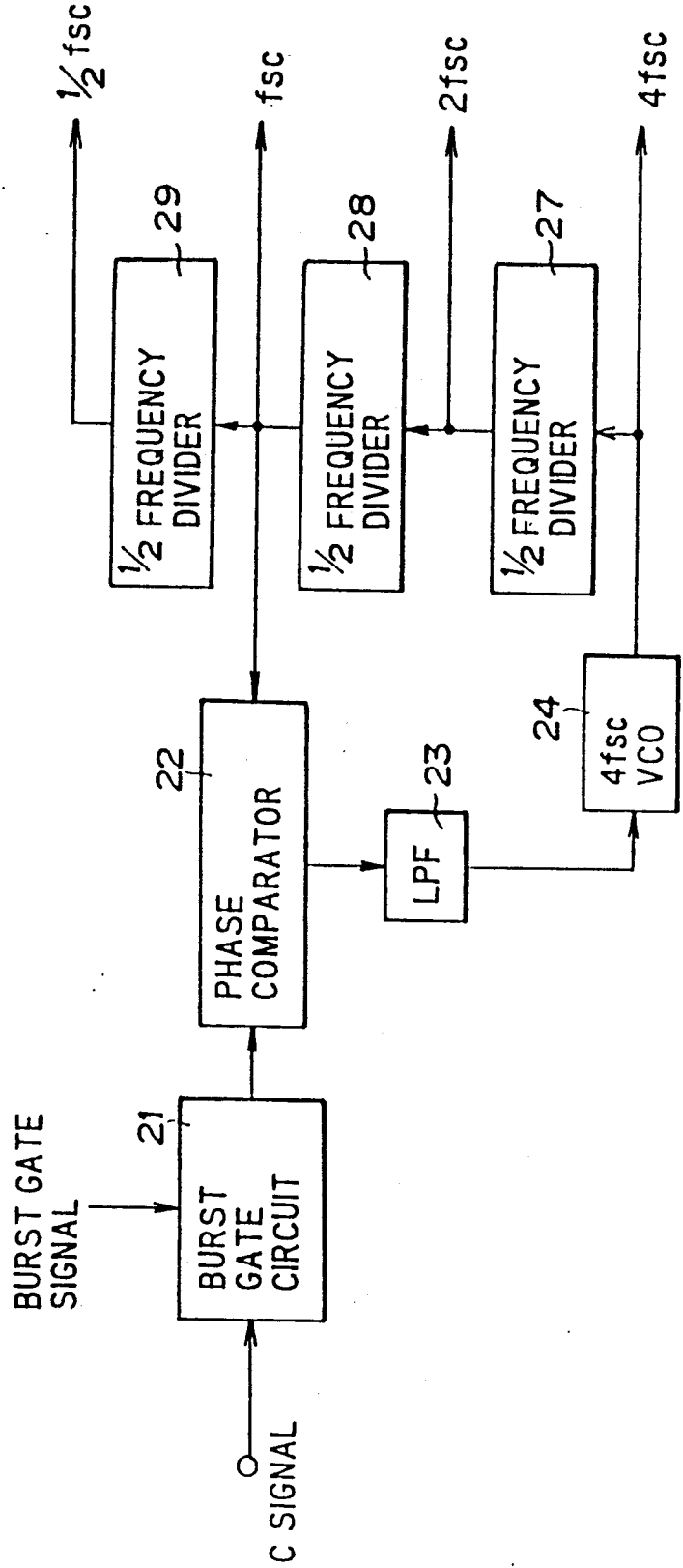
FIG. 2 is a block diagram showing a clock generator used in FIG. 1.

The clock generator 105 is shown in more detail in FIG. 2. In the clock generator 105, an analog chroma signal c and a burst gate signal are supplied to a burst gate circuit 21, an output of which is supplied to a phase comparator 22 together with an output of a ½ frequency divider 28. An output of the phase comparator 22 is supplied to a low pass filter 23, through which a low frequency component is passed. The low frequency is a component supplied to a voltage control oscillator 24, in which a clock signal of a frequency 4 fsc is generated. The clock signal is supplied to a ½ frequency divider 27 to generate a clock signal of a frequency 2 fsc which is then supplied to the ½ frequency divider 28. A clock signal of a frequency fsc supplied from the ½ frequency divider 28 is supplied to a ½ frequency divider 29 to generate a clock signal of a frequency ½ fsc.

As clearly understood from the above, the semiconductor memory 102 is required to have 48 input pins and 48 output pins.

Figure 3:
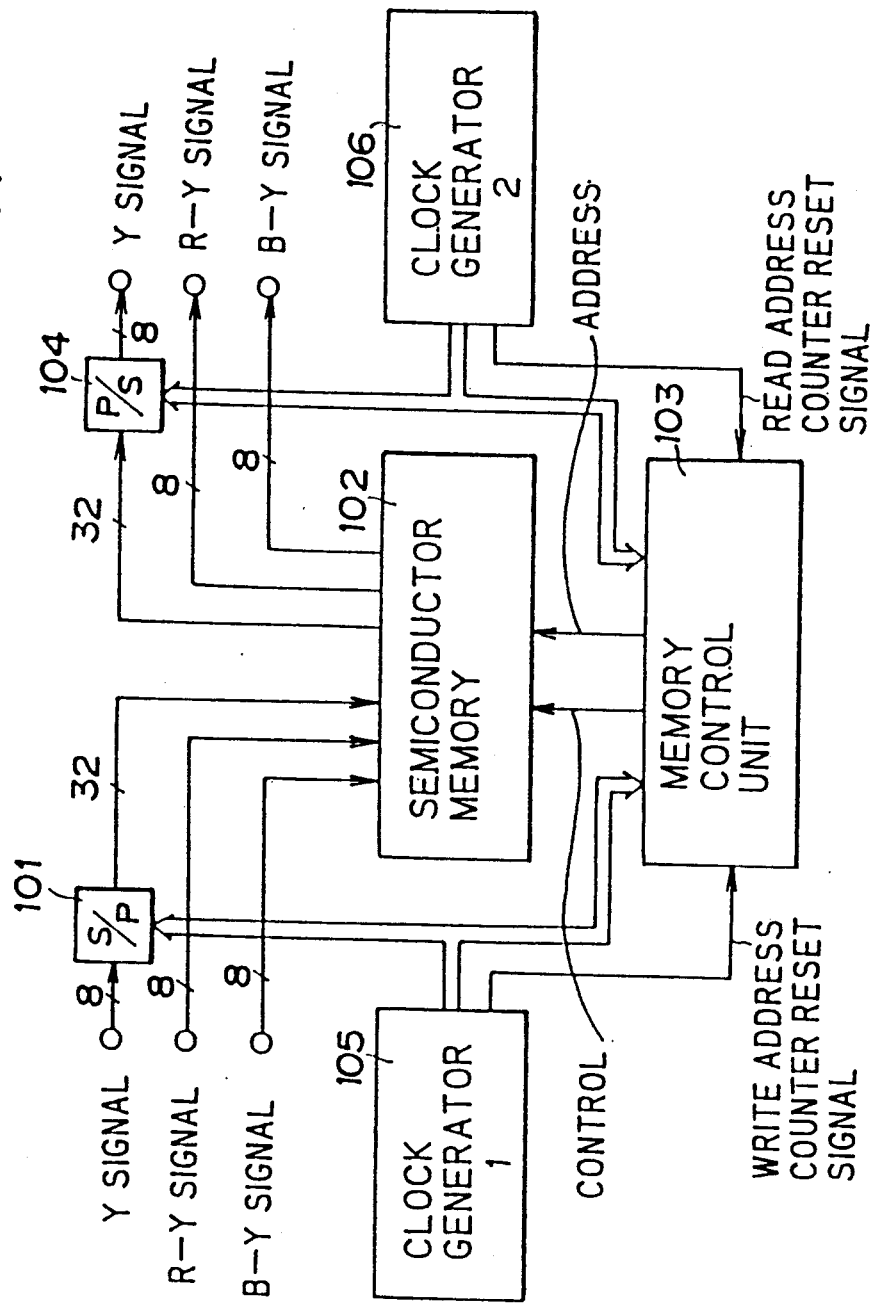
FIG. 3 is a further conventional circuit for processing digital video signals.

A further conventional circuit for processing digital video signals in which the correction of time base is carried out is shown in FIG. 3, wherein like parts are indicated by like reference numerals as used in FIG. 1.

In FIG. 3, a clock generator 106 is further provided to generate a clock signal for controlling the reading of the signals Y, R−Y and B−Y from the semiconductor memory 102. Consequently, the clock generator 105 generates a clock signal for controlling the writing of the signals Y, R−Y and B−Y into the semiconductor memory 102. Further, the clock generators 105 and 106 generate a write-address counter reset signal and a read-address counter reset signal, respectively, which are supplied to the memory control unit 103.

Figure 4:
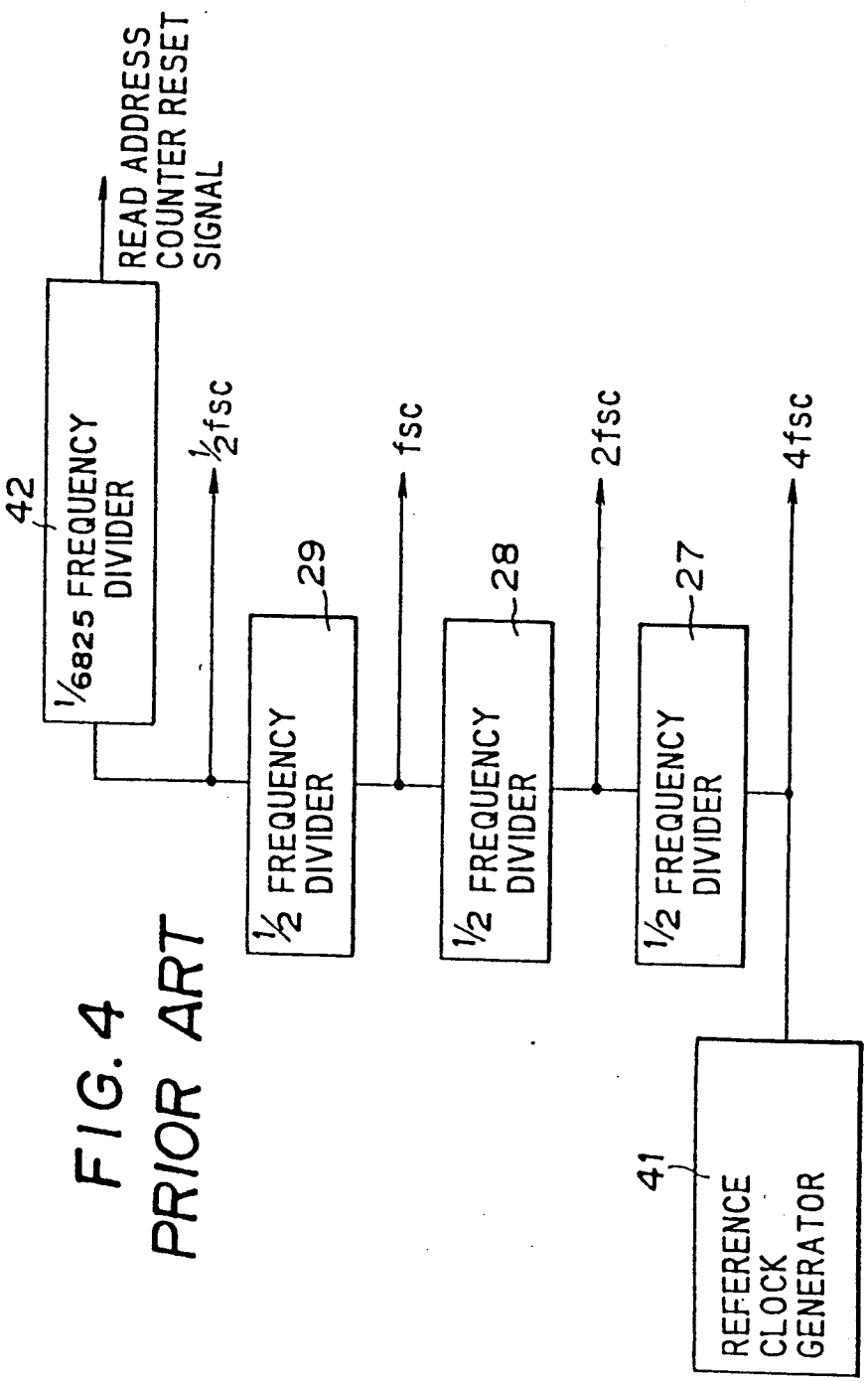
FIG. 4 is a block diagram showing a clock generator used in FIG. 3.

FIG. 4 shows the clock generator 106 which comprises a reference clock generator 41 for generating a clock signal of a frequency 4 fsc, ½ frequency dividers 27, 28 and 29 for generating clock signals of frequencies 2 fsc, fsc and ½ fsc, and a 1/6825 frequency divider 42 for generating the read-address counter reset signal.

In the correction of time base, it is considered that a memory amount of ±30 lines is required in a normal operation. In the NTSC system, the correction of time base is possible to be carried out in the aforementioned conventional circuit by 60 lines, as calculated below.

$$\{455/2 \times \tfrac{1}{2} \times (1/6825)\}^{-1} = 60$$

Figure 5:
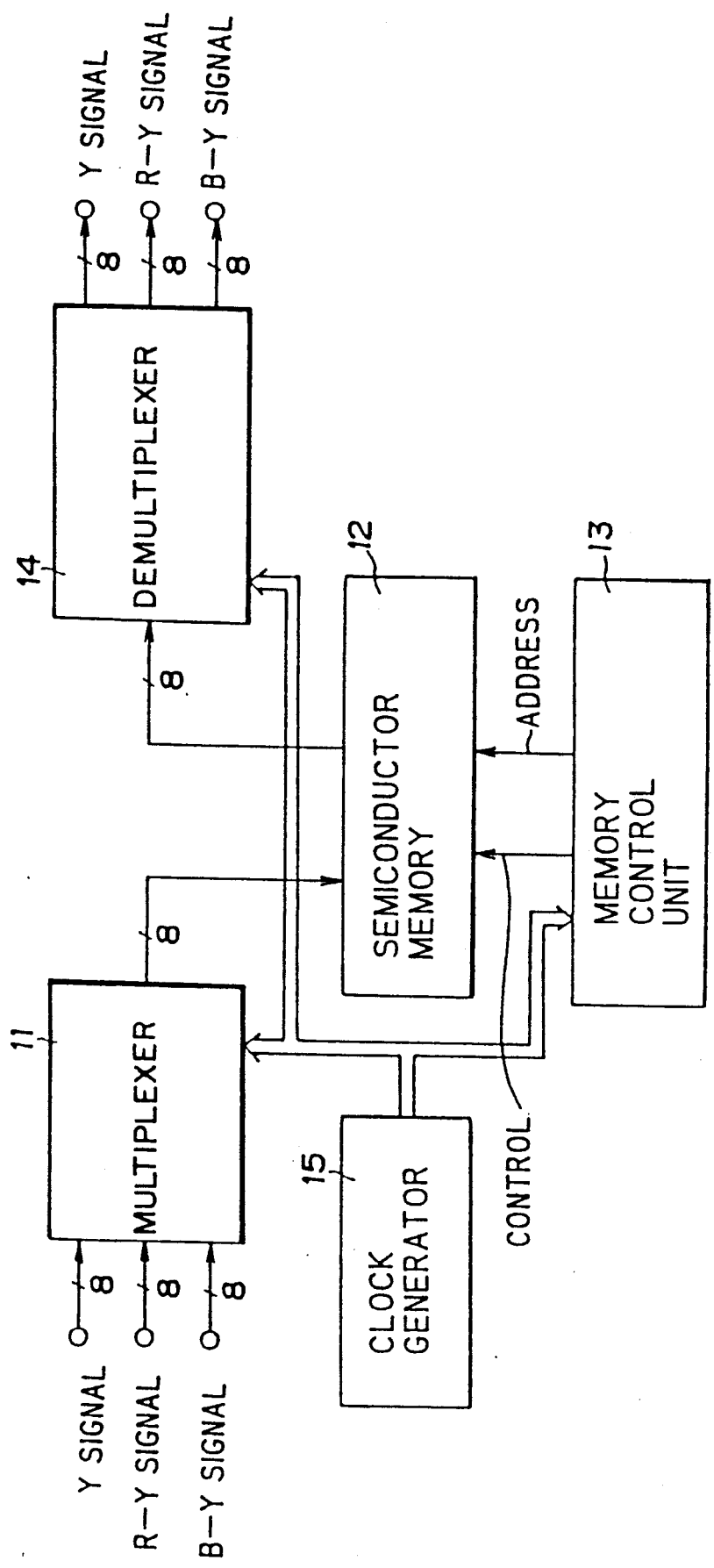
FIG. 5 is a block diagram showing a circuit for processing digital video signals in a first embodiment according to the invention.

Next, a circuit for processing digital video signals in the first embodiment will be explained in FIG. 5.

In the circuit for processing digital video signals, the luminance signal of the sampling signal 2 fsc, and the color difference signals R−Y and B−Y of the sampling signal ½ fsc are supplied in parallel to a multiplexer 11, such as a 24 to 8 multiplexer, from which serial data of 8 bits are supplied to a semiconductor memory 12 in accordance with clock signals supplied from a clock generator 15. The semiconductor memory 12 is controlled to store the serial data in accordance with write-control signals and address signals supplied from a memory control unit 13, to which clock signals are supplied from the clock generator 15. The serial data thus written into the semiconductor memory 12 are out read therefrom by the control of the memory control unit 13, so that the read-out serial data of 8 bits are supplied to a demultiplexer 14, such as a 8 to 24 demultiplexer in which the luminance signal Y of the sampling signal 2 fsc, and the color difference signals R−Y and B−Y of the sampling signal ½ fsc are obtained, and then supplied to a following stage (NTSC encoder not shown.)

Figure 6:
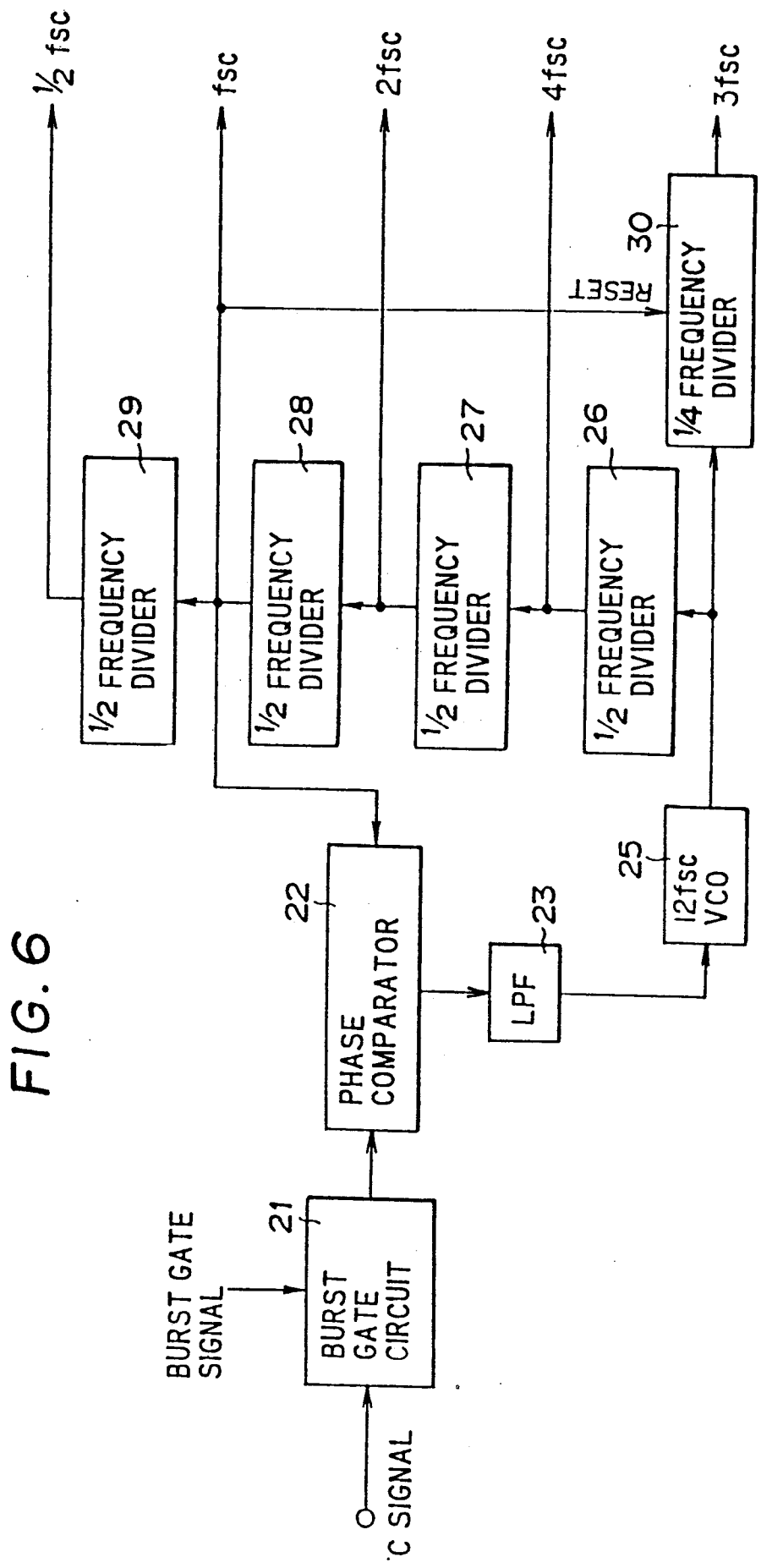
FIG. 6 is a block diagram showing a clock generator used in the first embodiment.

FIG. 6 shows the clock generator 15, wherein like parts are indicated by like reference numerals as used in FIG. 2, provided that a 12 fsc voltage control oscillator 25 is provided in place of the 4 fsc voltage control oscillator 24, and a ¼ frequency divider 30 is further provided to receive a clock signal of a frequency 12 fsc.

The ¼ frequency divider 30 generates a clock signal of a frequency 3 fsc rising-up in accordance with the rising-up of a clock signal of a frequency fsc supplied from the ½ frequency divider 28.

Figure 7:
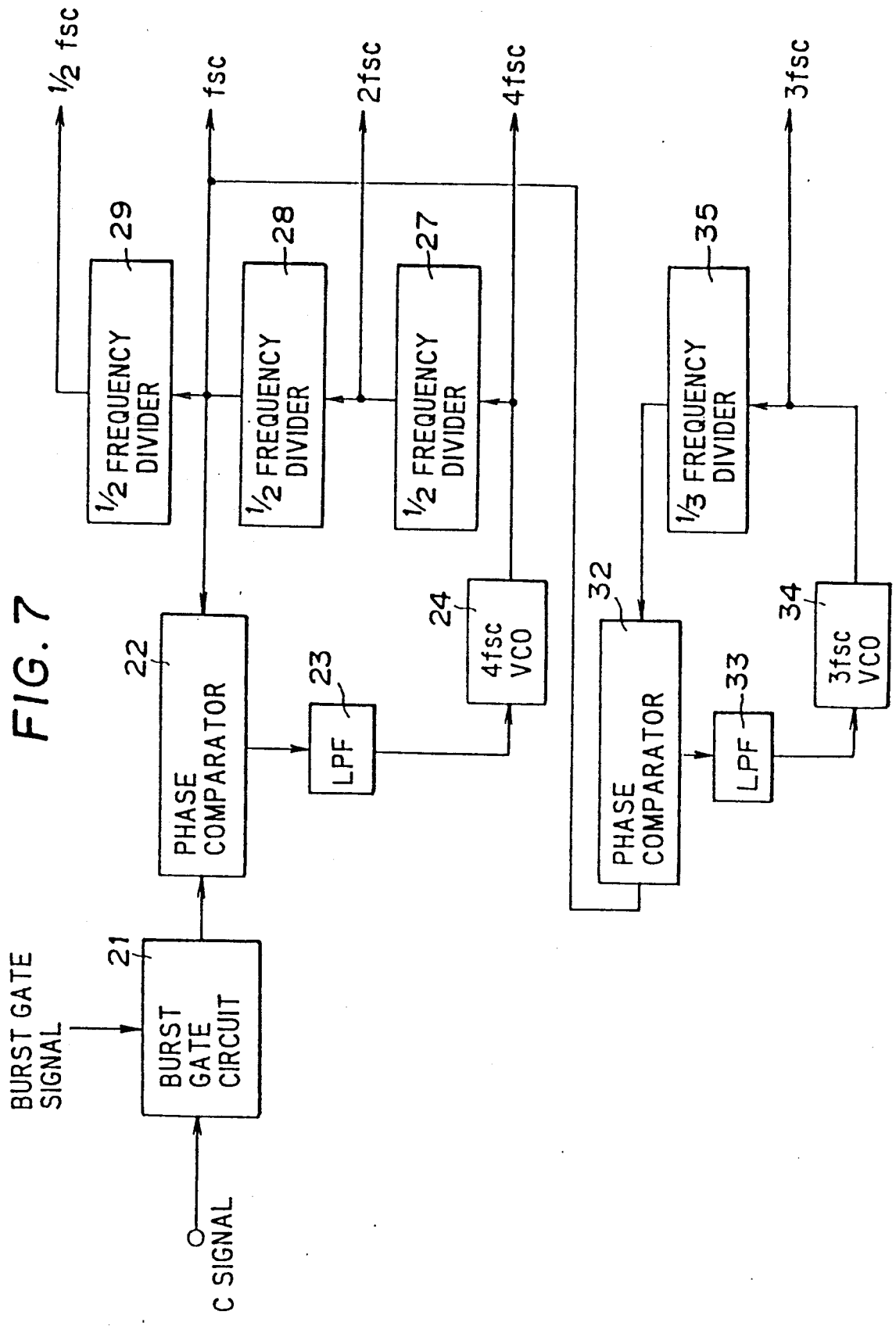
FIG. 7 is a block diagram showing a modification of the clock generator used in the first embodiment.

FIG. 7 shows a modification of the clock generator 15, wherein like parts are indicated by like reference numerals as used in FIG. 2, provided that a phase comparator 32, a low pass filter 33, a 3 fsc voltage control oscillator 34, and a ⅓ frequency divider 35 are further provided therein. In the clock generator 15, outputs of the ½ and ⅓ frequency dividers 28 and 35 are supplied to the phase comparator 32, an output of which is supplied to the low pass filter 33. The 3 fsc voltage control oscillator 34 is supplied with an output of the low pass filter 33 to generate a clock signal of a frequency 3 fsc. Thus, the 3 fsc clock signal is generated in accordance with the phase lock loop of the fsc clock signal, so that the fsc, 2 fsc, 3 fsc and 4 fsc clock signals are risen up synchronously with the rising-up of the ½ fsc clock signal.

Figure 8:
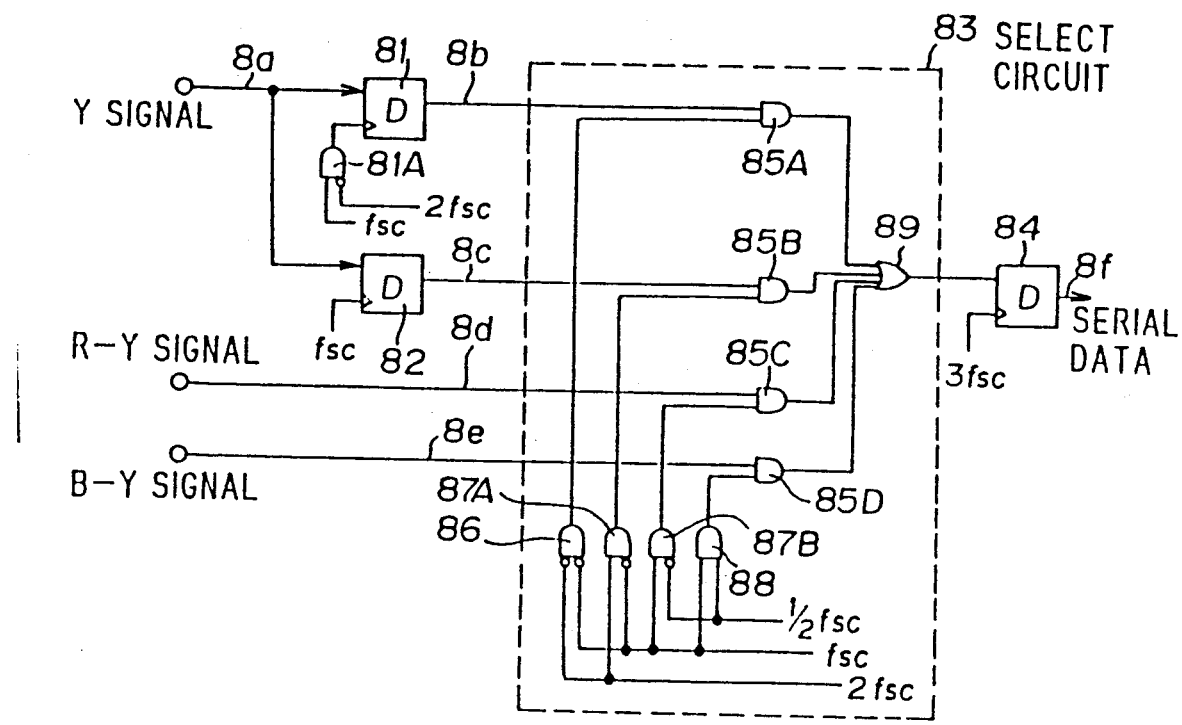
FIG. 8 is a block diagram showing a multiplexer used in the first embodiment.

FIG. 8 shows the multiplexer 11 which comprises D-flip flops 81 and 82 connected to an input terminal for the luminance signal Y, a selector circuit 83 including AND circuits 85A to 85D, a NOR circuit 86, NAND circuits 87A and 87B, an AND circuit 88, and an OR circuit 89 and connected to outputs of the D-flip flops 81 and 82, and input terminals for the color difference signals R−Y and B−y, and a D-flip flop 84 connected to an output of the selector circuit 83 to supply the serial data to the semiconductor memory 12. In the multiplexer 11, the ½ fsc, fsc, 2 fsc and 3 fsc clock signals are supplied to predetermined input terminals from the clock generator 15, as indicated therein.

Figure 9:
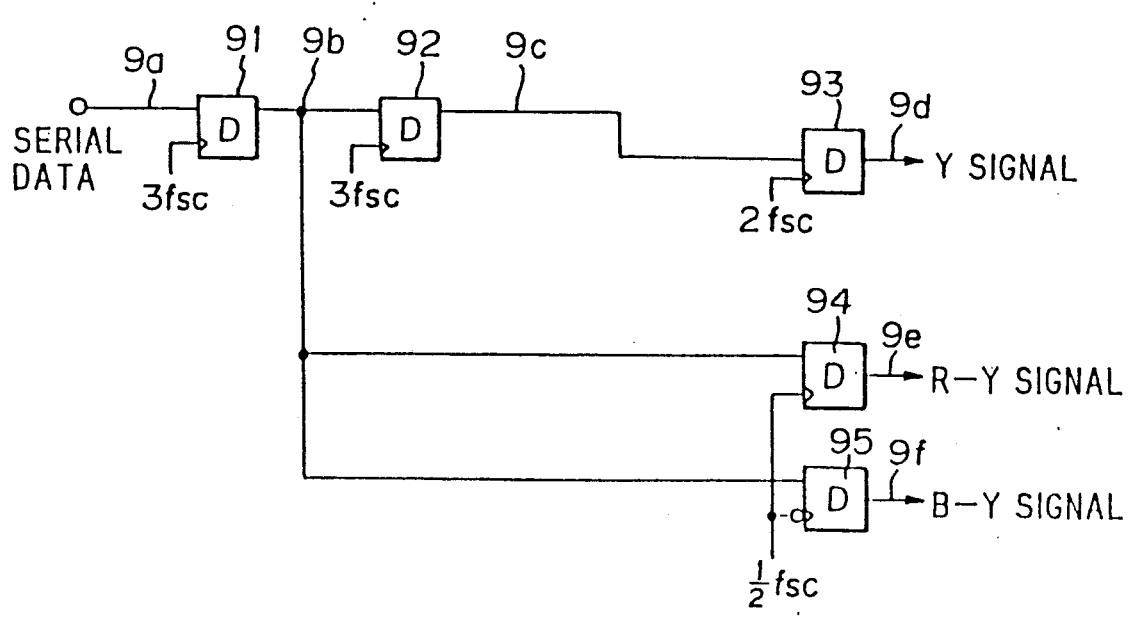
FIG. 9 is a block diagram showing a demultiplexer used in the first embodiment.

FIG. 9 shows the demultiplexer 14 which comprises a D-flip flop 91 connected to an input terminal for the serial data read from the semiconductor memory 12, a D-flip flop 92 connected to an output of the D-flip flop 91, a D-flip flop 93 connected to an output of the D-flip flop 92 to supply the luminance signal Y, and D-flip flops 94 and 95 connected in parallel to the output of the D-flip flop 91 to supply the color difference signals R−Y and B−Y, respectively.

Figure 10:
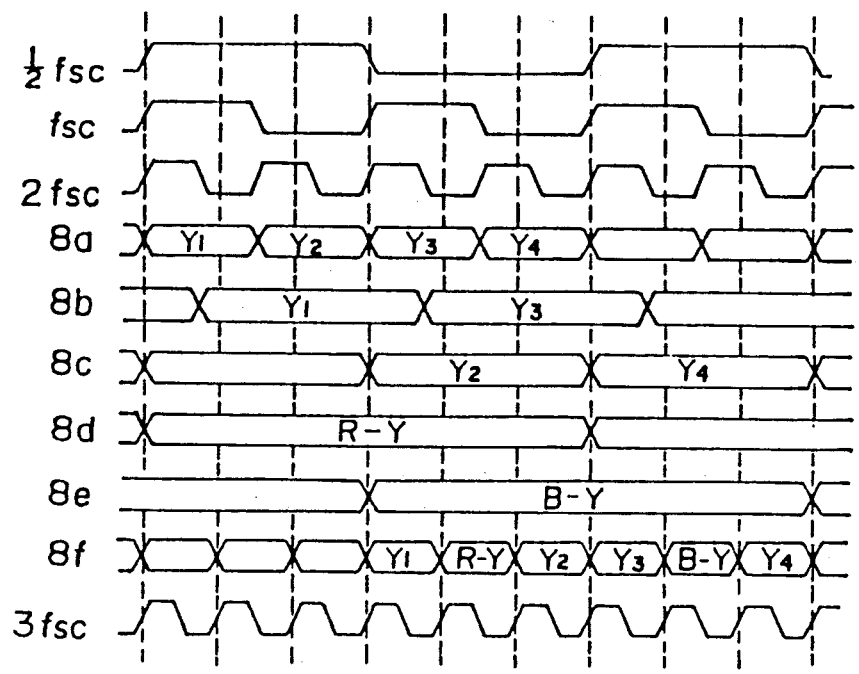
FIGS. 10 and 11 are timing charts showing operation of the multiplexer and demultiplexer in the first embodiment.

In operation, the luminance signals $Y_1$, $Y_2$, $Y_3$, $Y_4$... of the sampling signal 2 fsc are supplied to the D-flip flops 81 and 82 in the P/S converter 11 (8a in FIG. 10), so that the luminance signals $Y_1$, $Y_3$... of the frequency ½ fsc is obtained at the output of the D-flip flop 81 (8b in FIG. 10) in accordance with an output of a NAND circuit 81A, to which the fsc and 2 fsc clock signals are supplied, and the luminance signals $Y_2$, $Y_4$... of the frequency ½ fsc are obtained at the output of the D-flip flop 82 (8c in FIG. 10) in accordance with the fsc clock signal supplied thereto. Simultaneously, the color difference signals R−Y and B−Y of the sampling signal ½ fsc are supplied to the AND circuits 85C and 85D in the selector circuit 83 (8C and 8D in FIG. 10), respectively, which are controlled by outputs of the NAND and AND circuits 87B and 88 receiving the ½ fsc and fsc clock signals. The luminance signals $Y_1$, $Y_3$... and $Y_2$, $Y_4$... are supplied to the AND circuits 85A and 85B in the selector circuits 83, respectively, which are controlled by outputs of the NOR and NAND circuits 86 and 87A receiving the fsc and 2 fsc clock signals. Outputs of the AND circuits 85A to 85D are supplied through the OR circuit 89 to the D-flip flop 84 which is controlled by the 3 fsc clock signal, so that the serial data are obtained and then supplied to the semiconductor memory 12 (8f FIG. 10).

Figure 11:
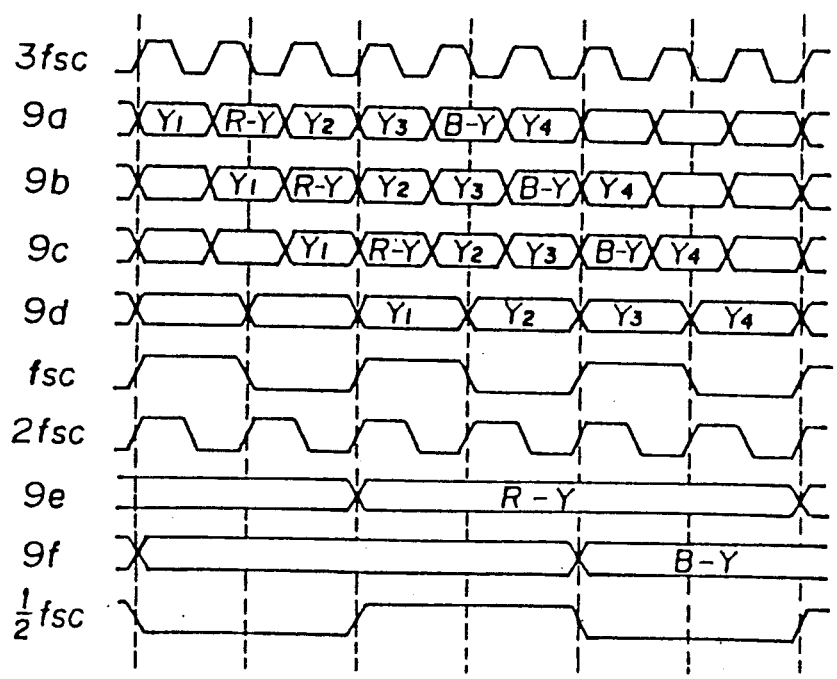

The serial data are written into the semiconductor memory 12, and read out therefrom to be supplied to the D-flip flop 91 in the demultiplexer 14 (9a in FIG. 11). The D-flip flop 91 is controlled to supply the serial data to the D-flip flops 92, 94 and 95 by the 3 fsc clock signal (9b in FIG. 11). The D-flip flop 92 is controlled to supply the serial data to the D-flip flop 93 by the 3 fsc clock signal (9c in FIG. 11), and the D-flip flop 93 is controlled to generate the luminance signal $Y_1$, $Y_2$, $Y_3$, $Y_4$... of the sampling signal 2 fsc by the 2 fsc clock signal (9d in FIG. 11). On the other hand, the D-flip flops 94 and 95 are controlled to generate the color difference signals R−Y and B−Y of the sampling signal ½ fsc by the ½ fsc clock signal (9e and 9f in FIG. 11).

As understood from the above, the phase relation of the serial data comprising the luminance, and color difference signals is clearly specified by use of the ½ fsc, 2 fsc and 3 fsc clock signals. Therefore, a demultiplexer can be provided to carry out a precise serial-to-parallel conversion for serial data supplied from an arbitrary multiplexer for parallel-to-serial conversion. Consequently, the number of input and output pins is reduced in the semiconductor memory 12, in which a delay time of 6 n periods relative to the 3 fsc clock signals is obtained in the first embodiment, where n is an integer.

Figure 12:
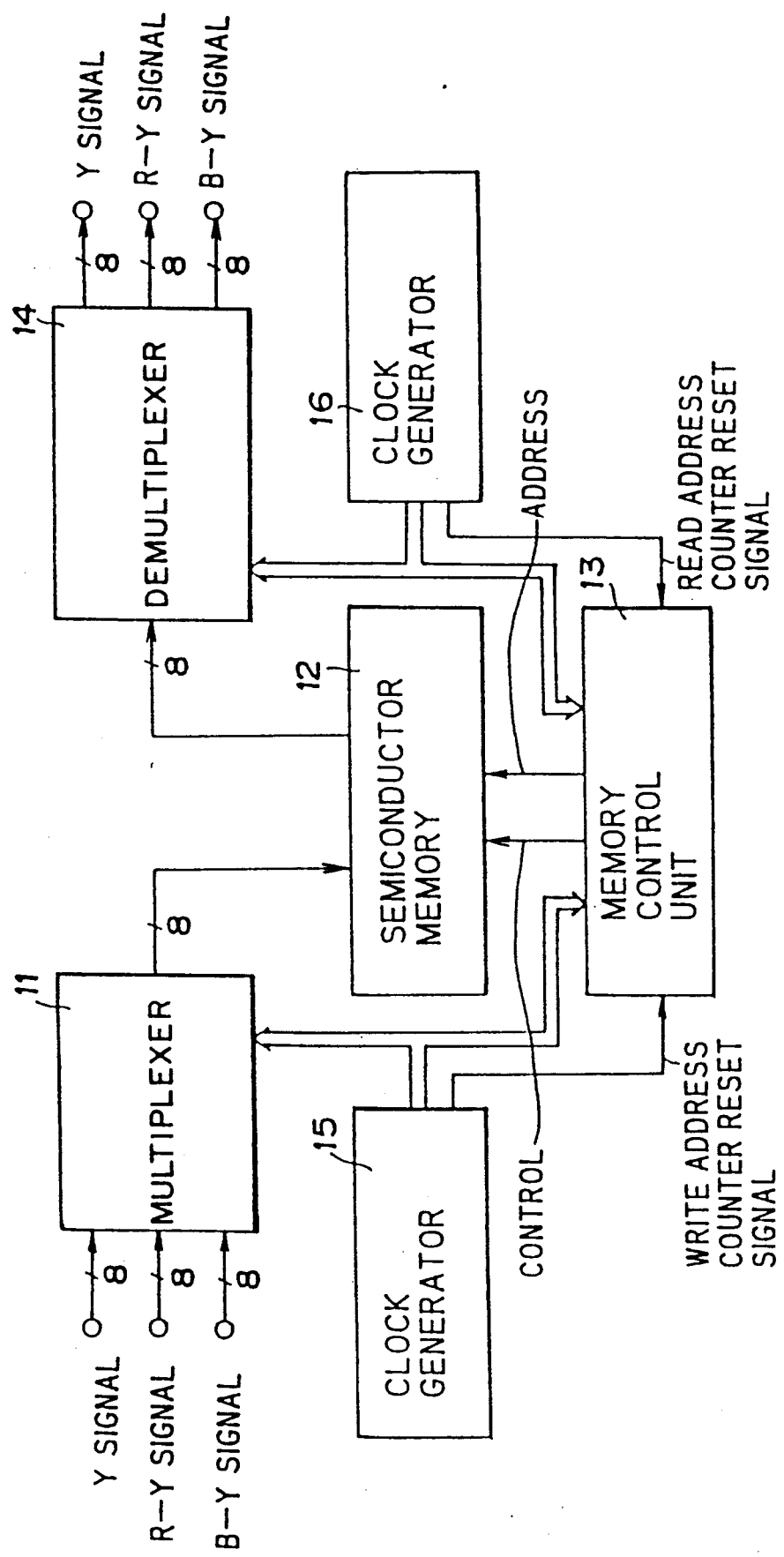
FIG. 12 is a block diagram showing a circuit for processing digital video signals in a second embodiment according to the invention.

A circuit for processing digital video signals in the second embodiment according to the invention will be explained in FIG. 12, wherein like parts are indicated by like reference numerals used in FIG. 5, except for the difference that the clock generator 15 generates a write address counter reset signal and clock signals exclusively used in the multiplexer 11 and in the writing of serial data into the semiconductor memory 12, and a clock generator 16 is further provided to generate a read address counter reset signal and clock signals exclusively used in the demultiplexer 14 and in the reading of the serial data from the semiconductor memory 12. The second embodiment is adapted to carry out the correction of time base.

Figure 13:
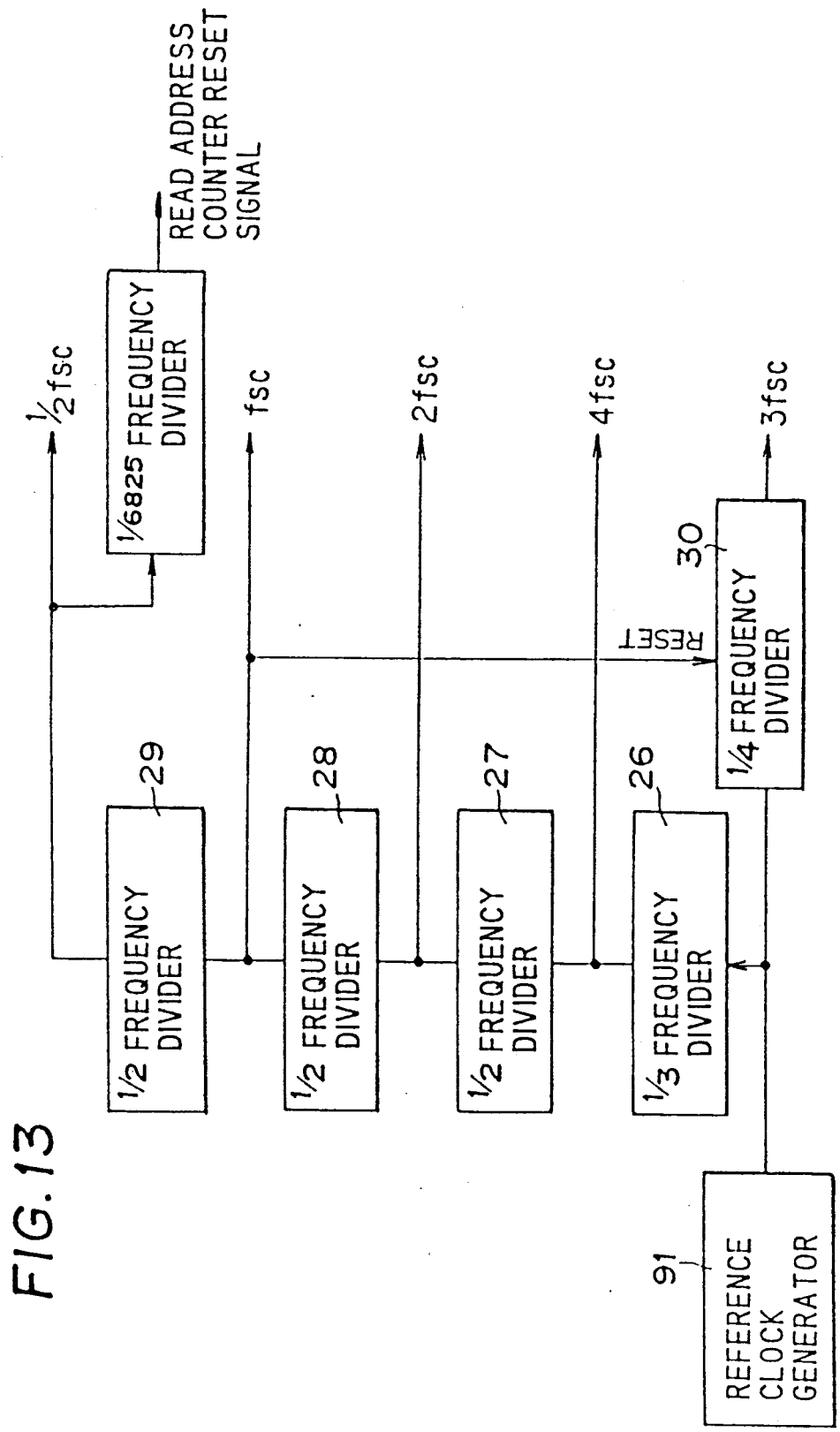
FIG. 13 is a block diagram showing a clock generator in the second embodiment.

FIG. 13 shows the clock generator 16, wherein like parts are indicated by like reference numeral used in FIG. 6, except for the difference that a reference clock generator 91 is provided in place of the burst gate circuit 21, the phase comparator 22, the low pass filter and the 12 fsc voltage control oscillator 25, and a 1/6825 frequency divider 92 is further provided to generate the read address counter reset signal. The clock generator 15 is the same as the clock generator 16.

In the second embodiment, the write and read address counter reset signals are supplied from the clock generators 15 and 16 to the memory control unit 13, respectively, so that the phase relation between input serial data of the semiconductor memory 12 and clock signals of the clock generator 15 can be identical to the phase relation between output serial data of the semiconductor memory 12 and clock signals of the clock generator 16, even if the delay relation between the input and output serial data of the semiconductor memory 12 is not constant, and the clock signals for the circuits converters 11 and 14 are not synchronous. Therefore, a precise S/P conversion is carried out in the demultiplexer 14 for serial data supplied from an arbitrary demultiplexer such as the multiplexer 11, because respective phase relations of the clock signals of the frequencies ½ fsc, fsc, 2 fsc and 3 fsc generated in the clock generator 15 are controlled to be the same as those of the ½ fsc, fsc, 2 fsc and 3 fsc clock signals generated in the clock generator 16, as explained in connection with the clock generator as shown in FIG. 6.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A circuit for processing digital video signals, comprising:
    first means for converting a luminance signal and first and second color difference signals received in parallel into said luminance signal and said first and second color difference signals serially arranged in time-division;
    a semiconductor memory connected to said first means for storing said luminance signal and said first and second color difference signals serially arranged in time-division;
    second means connected to said semiconductor memory and adapted for converting said luminance signal and said first and second color difference signals serially arranged in time-division into said luminance signal and said first and second color difference signals to be supplied in parallel, said serially arranged signals being read out from said semiconductor memory; and
    a clock generator connected to said first means, said second means, and said semiconductor memory, respectively, and including an oscillator for generating a 12 f... clock signal, and frequency dividers for dividing said 12 f... clock signal to provide ½ f..., f... and 3 f... clock signals, where f... is a color sub-carrier frequency, said ½ f..., f..., 2f..., and 3f... clock signals being risen up synchronously with rising-up of said f... clock signal;
    wherein said parallel-received luminance signal is sampled by said 2f... clock signal, said parallel-received first and second color difference signals are sampled by said ½ f... clock signal, and said serially arranged signals are written into and read out from said semiconductor memory by said 3f... clock signal.

2. A circuit for processing digital video signals according to claim 1, wherein:
    said clock generator further includes a burst gate circuit and a phase comparator connected to said burst gate circuit for comparing an output signal of said burst gate circuit receiving an analog chroma signal and a burst gate signal with said f... clock signal, so that said oscillator is controlled by a low frequency component of an output signal of said phase comparator.

3. A circuit for processing digital video signals, comprising:
    first means for converting a luminance signal and first and second color difference signals received in parallel into said luminance signal and said first and second color difference signals serially arranged in time-division.
    a semiconductor memory connected to said first means for storing said luminance signal and said first and second color difference signals serially arranged in time-division;
    second means connected to said semiconductor memory and adapted for converting said luminance signal and said first and second color difference signals serially arranged in time-division into said luminance signal and said first and second color difference signals arranged in parallel, said serially arranged signals being read out from said semiconductor memory; and a clock generator for supplying clock signals to said first and second means and including first and second oscillators for generating 3 f . . . and 4 f . . . clock signals, respectively, and frequency dividers for dividing said 4 f . . . clock signals to provide ½ f . . . , f . . . , and 2 f . . . clock signals which are risen up synchronously with rising-up of said f . . . clock signals, where f . . . is a color sub-carrier frequency;

wherein said parallel-received luminance signal is sampled by said 2 f . . . clock signal, said parallel-received first and second color difference signals are sampled by said ½ f . . . clock signal, and said serially arranged signals are written into and read out from said semiconductor memory by said 3 f . . . clock signal.

4. A circuit for processing digital video signals according to claim 3, wherein:

said clock generator further includes a burst gate circuit receiving an analog chrome signal and a burst gate signal with said f . . . clock signal, and a first phase comparator for comparing an output signal of said burst gate circuit so that said second oscillator is controlled by a low frequency component of an output signal of said first phase comparator, and a second phase comparator for comparing said f . . . clock signal, and a clock signal obtained in a division of said 3 f . . . clock signal by three, so that said first oscillator is controlled by a low frequency component of an output signal of said second comparator.

5. A circuit for processing digital video signals comprising:

first means for converting a luminance signal and first and second color difference signals received in parallel into said luminance signal and said first and second color difference signals serially arranged in time-division.

a semiconductor memory connected to said first means for storing said luminance signal and said first and second color difference signals serially arranged in time-division;

second means connected to said semiconductor memory and adapted for converting said luminance signal and said first and second color difference signals serially arranged in time-division into said luminance signal and said first and second color difference signals arranged in parallel, said serially arranged signals being read out from said semiconductor memory;

a first clock generator connected to said first means and said semiconductor memory, respectively, and including an oscillator for generating a 12 f . . . clock signal, and frequency dividers for dividing said 12 f . . . clock signal to provide ½ f . . . , f . . . , 2 f . . . , and 3 f . . . clock signals, where f . . . is a color sub-carrier frequency, said ½ f . . . , f . . . , 2 f . . . , and 3 f . . . clock signals being risen up synchronously with rising-up of said f . . . clock signal, said first clock generator generating a write address counter reset signal and clock signals used in said first means;

wherein said parallel-received luminance signal is sampled by said 2 f . . . clock signal, said parallel-received first and second color difference signals are sampled by said ½ f . . . clock signal, and said serially arranged signals are written into and read out from said semiconductor memory by said 3 f . . . clock signal; and a second clock generator connected to said second means and said semiconductor memory, respectively, and generating a read address counter reset signal and clock signal used in said second means, said serially arranged signals being written and read out from said semiconductor memory.

6. A circuit for processing digital video signals according to claim 5, wherein:

said second clock generator includes a reference clock generator, frequency dividers connected to said reference clock generator and providing ½ f . . . , f . . . , 2 f . . . , 3 f . . . and 4f clock signals, where f . . . is a color sub-carrier frequency, and a 1/6825 frequency divider generating the read address counter reset signal.

* * * * *